US012072077B1

(12) United States Patent
Xu et al.

(10) Patent No.: US 12,072,077 B1
(45) Date of Patent: Aug. 27, 2024

(54) LED LAMP

(71) Applicant: SHENZHEN SNC OPTO ELECTRONIC CO., LTD, Shenzhen (CN)

(72) Inventors: Jianyong Xu, Shenzhen (CN); Anle Zhao, Shenzhen (CN); Zhiping Ma, Shenzhen (CN); Xujian Ma, Shenzhen (CN)

(73) Assignee: SHENZHEN SNC OPTO ELECTRONIC CO., LTD, Shenzhen (CN)

( * ) Notice: Subject to any disclaimer, the term of this patent is extended or adjusted under 35 U.S.C. 154(b) by 0 days.

(21) Appl. No.: 18/531,456

(22) Filed: Dec. 6, 2023

(30) Foreign Application Priority Data

Jun. 14, 2023 (CN) ......................... 202310704061.5

(51) Int. Cl.

*F21V 14/02* (2006.01)
*F21V 29/74* (2015.01)
*F21Y 115/10* (2016.01)

(52) U.S. Cl.

CPC .............. *F21V 14/02* (2013.01); *F21V 29/74* (2015.01); *F21Y 2115/10* (2016.08)

(58) Field of Classification Search

CPC .......... F21V 14/02; F21V 29/74; F21V 14/06; F21V 14/065; F21V 14/08; F21V 14/085; F21V 14/00; F21V 29/503; F21V 29/504; F21V 29/506; F21V 29/70; F21Y 2115/10

See application file for complete search history.

(56) References Cited

U.S. PATENT DOCUMENTS

| | | | | | |
|---|---|---|---|---|---|
| 9,255,687 | B2 * | 2/2016 | Gebhard | ................ | F21V 5/007 |
| 2016/0215961 | A1 * | 7/2016 | Kjeldsen | ................ | F21V 13/02 |
| 2017/0269292 | A1 * | 9/2017 | Jurik | ....................... | F21V 14/04 |
| 2019/0338922 | A1 * | 11/2019 | Jurik | ....................... | F21V 14/06 |

* cited by examiner

*Primary Examiner* — Bao Q Truong

(57) ABSTRACT

An LED lamp includes a heat sink defining a first installation groove arranged on a front surface thereof for receiving an LED light board therein, a first transparent plate covering on the LED light board, a rotating member and a moving member respectively installed on the heat sink, the moving member movably connected to the rotating member. The first transparent plate defines a first connecting portion arranged on a side of the first transparent plate near the moving member, and movably connected with the moving member. The present disclosure can conveniently adjust positions of the first transparent plate (i.e. a lens plate), according to requirements of different usage conditions, to further adjust distribution directions of light emitted from the LED lamp, which can adjust distribution directions of the light without needing to disassemble the LED lamp, and have a simple and convenient operation thereof.

16 Claims, 7 Drawing Sheets

LED LAMP

CROSS-REFERENCE TO RELATED APPLICATION

This application claims the benefit of priority from Chinese Patent Application No. 202310704061.5 entitled "LED LAMP" and filed on Jun. 14, 2023, the content of which is hereby incorporated by reference in its entire by reference.

BACKGROUND

Technical Field

The present disclosure generally relates to the field of lighting technologies, and especially relates to an LED lamp.

Description of Related Art

An LED lamp with a plurality of advantages such as energy conservation, environmental protection and a long lifespan, has been widely used in various lighting places. A conventional LED lamp generally includes a lens plate that is fixed, so that positions of the lens plate are not possible to be movably adjusted according to requirements of different usage conditions, thereby result in being unable to adjust distribution directions of light emitted from the LED lamp. Therefore, it is necessary to design a new LED lamp to solve the above problem.

SUMMARY

The technical problems to be solved: in view of the shortcomings of the related art, the present disclosure provides an LED lamp which can adjust distribution directions of light emitted from the LED lamp.

In a first aspect, an LED lamp according to an embodiment of the present disclosure includes: a heat sink, an LED light board and a first transparent plate, the heat sink defining a first installation groove arranged on a front surface thereof, the LED light board received in the first installation groove, and the first transparent plate covering on the LED light board; the LED lamp including a rotating member and a moving member movably connected with the rotating member; both the rotating member and the moving member installed on the heat sink and arranged on a side of the first transparent plate near a bottom wall of the first installation groove; the first transparent plate including a first connecting portion arranged on a side of the first transparent plate near the moving member to movably connect with the moving member.

In a second aspect, an LED lamp according to an embodiment of the present disclosure includes: a heat sink, an LED light board and a first transparent plate and an adjusting member, the heat sink defining a first installation groove thereof, the adjusting member installed on the heat sink and arranged on a side of the first transparent plate near a bottom wall of the first installation groove; the LED light board received in the first installation groove; and the first transparent plate arranged in the first installation groove and covering on the LED light board; and wherein the adjusting member is connected to the first transparent plate through a transmission way, and the adjusting member drives the first transparent plate to move along a direction perpendicular to the LED light board to adjust a distance between the first transparent plate and the LED light board, so as to further adjust distributions of light emitted from the LED light board.

The present disclosure provides the advantages as below: the present disclosure can conveniently adjust positions of the first transparent plate (i.e. a lens plate), according to requirements of different usage conditions, to further adjust distribution directions of light emitted from the LED lamp, which can adjust the distribution directions of light emitted from the LED lamp without needing to disassemble the LED lamp, and have a simple and convenient operation thereof.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

Figure 1:
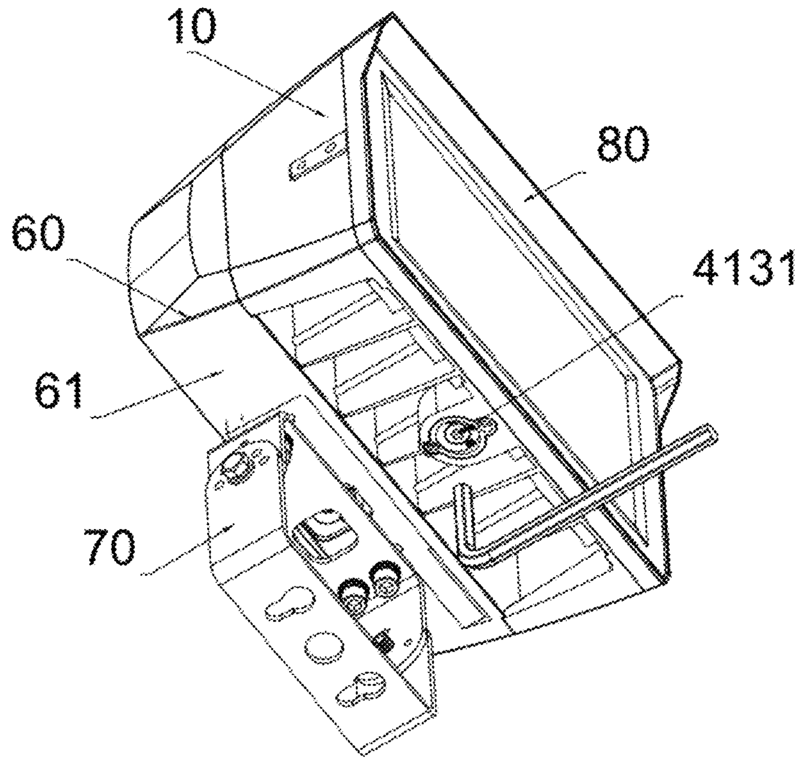
FIG. 1 is a schematic view of an LED lamp in accordance with an embodiment of the present disclosure.
Figure 2:
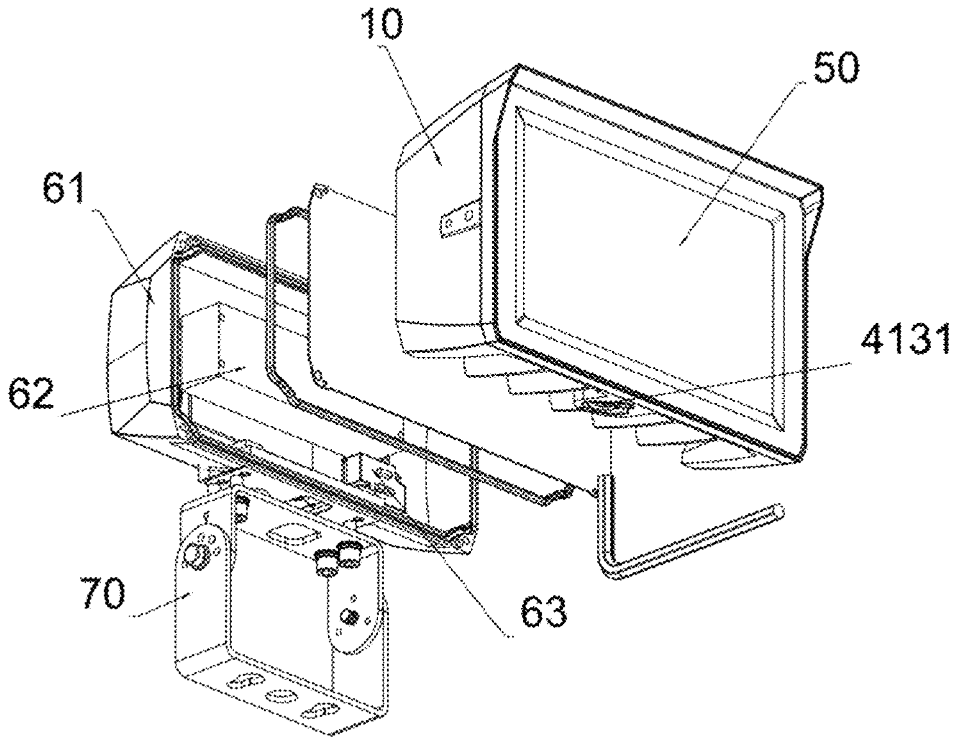
FIG. 2 is an exploded, schematic view of the LED lamp of FIG. 1.
Figure 3:
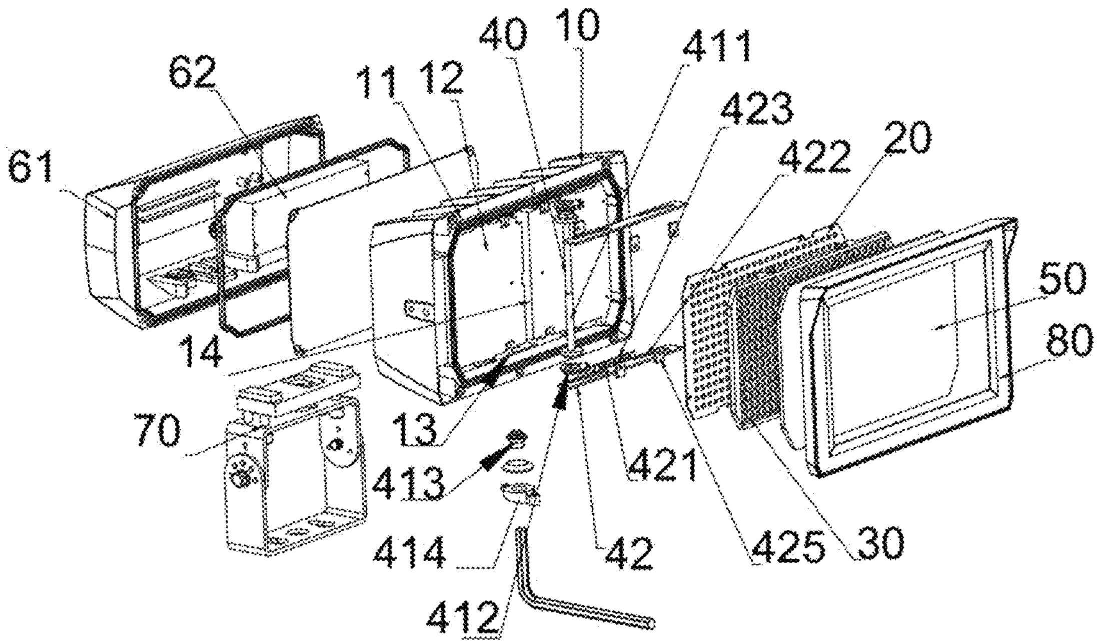
FIG. 3 is similar to FIG. 2, but shown from another view.
Figure 4:
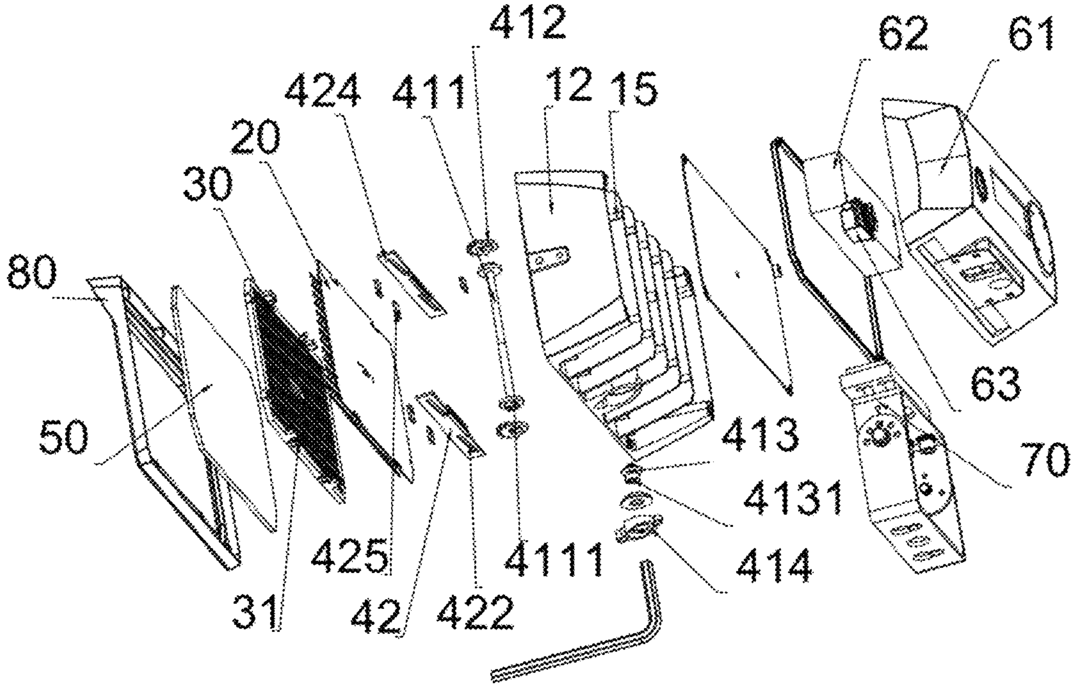
FIG. 4 is similar to FIG. 3, but shown from another view.
Figure 5:
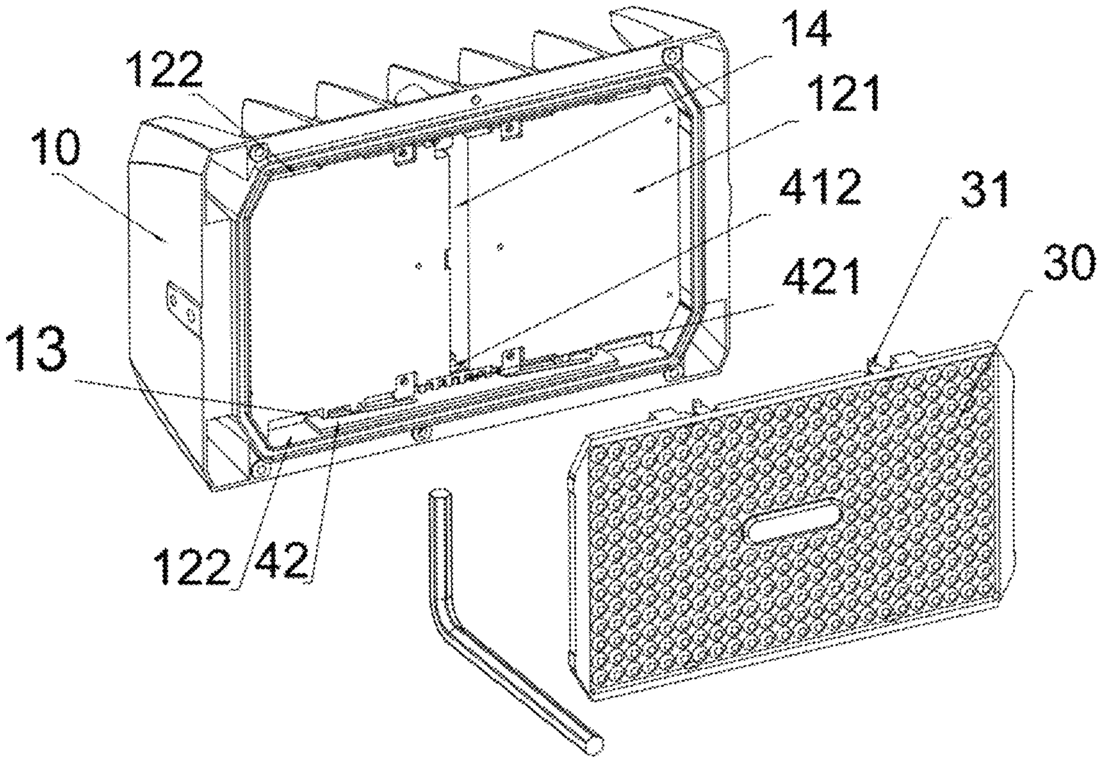
FIG. 5 is similar to FIG. 2, but shown from another view.
Figure 6:
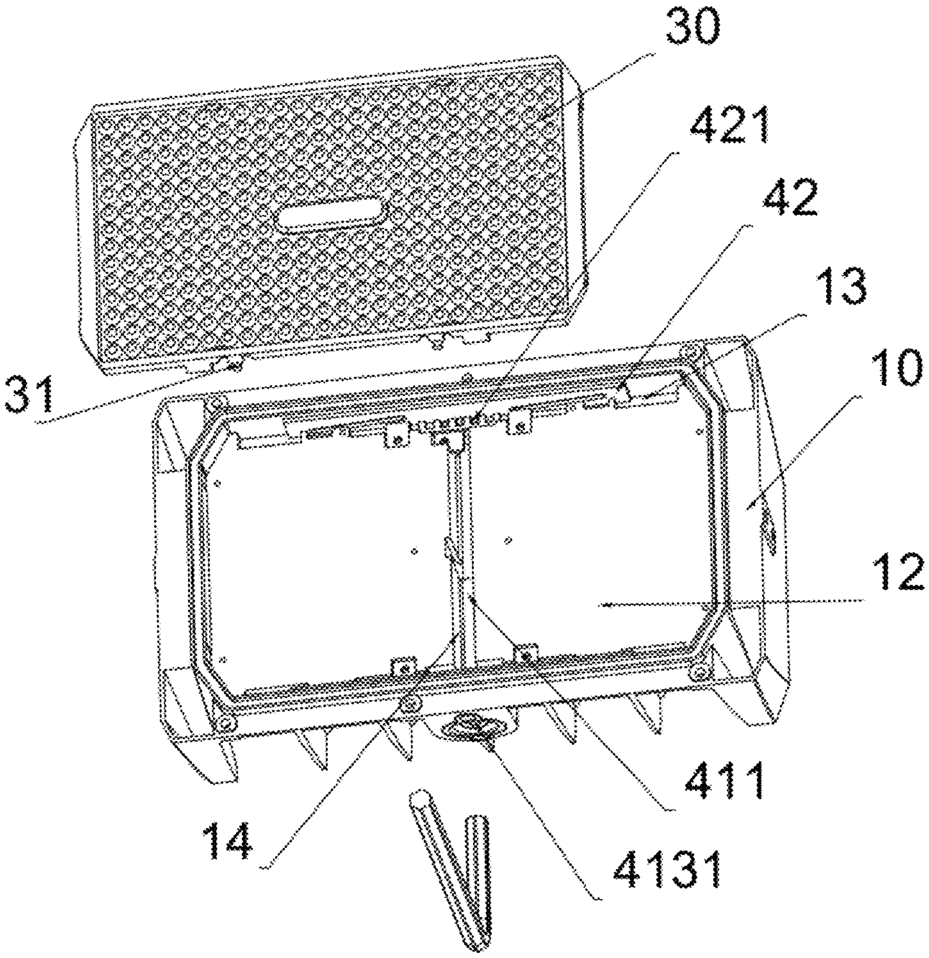
FIG. 6 is similar to FIG. 5, but shown from another view.
Figure 7:
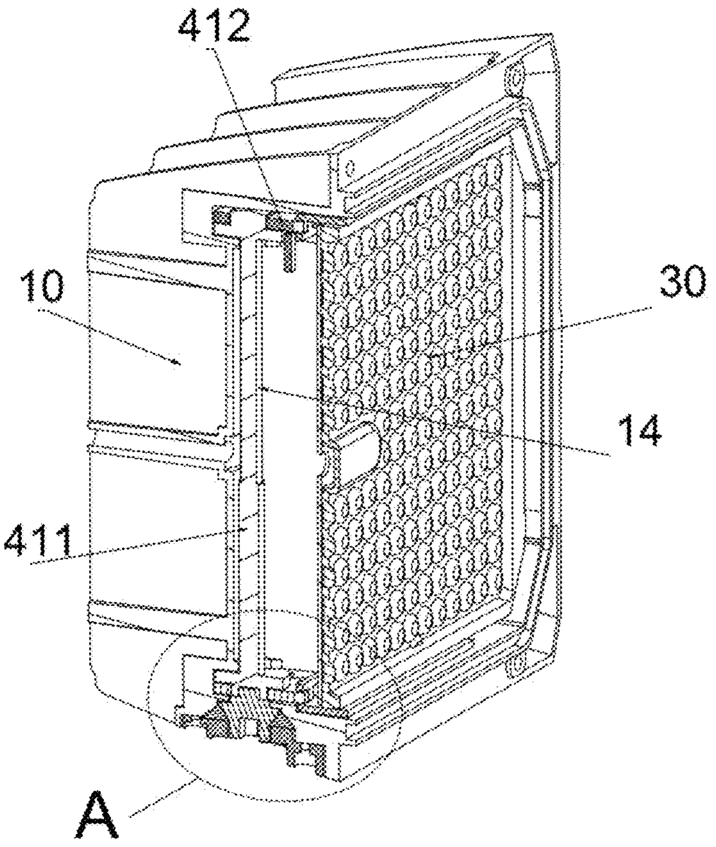
FIG. 7 is a partial cross sectional view of the LED lamp of FIG. 1.
Figure 8:
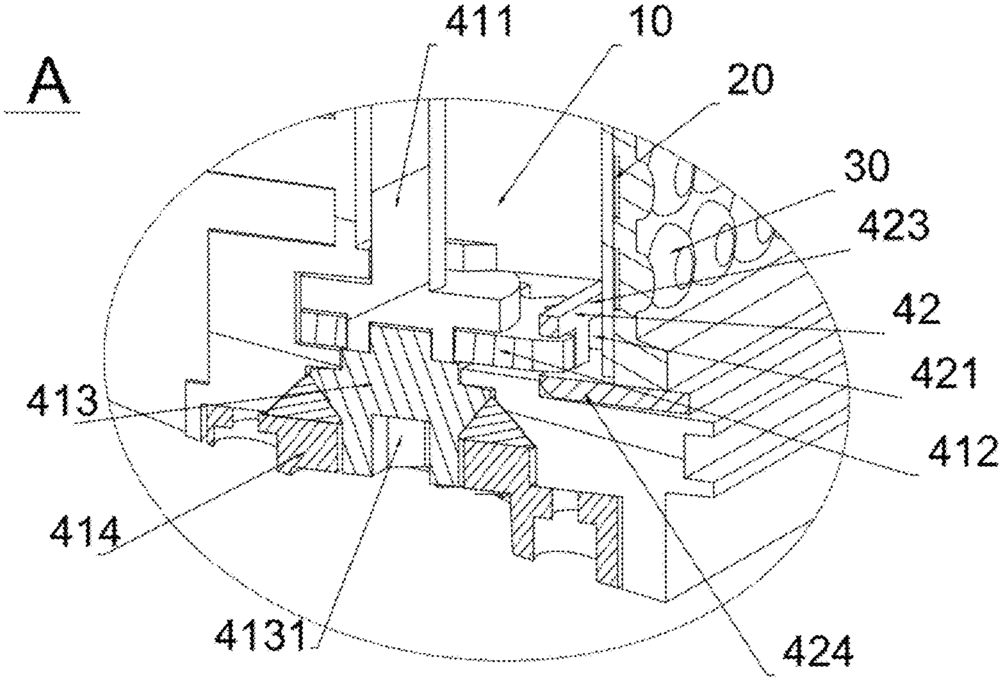
FIG. 8 is an enlarged view of a circle A of FIG. 7.

The element labels according to the embodiment of the present disclosure shown as below:

10 heat sink, 11 front surface, 12 first installation groove, 121 bottom wall, 122 side, 13 second installation groove, 14 third installation groove, 15 back surface, 20 LED light board, 30 first transparent plate, 31 first connecting portion, 40 adjusting member, 41 rotating member, 411 rotation shaft, 4111 end portion, 412 gear, 413 rotating portion, 4131 inner hexagonal hole, 414 shaft sleeve, 42 moving member, 421 tooth-hole, 422 passageway, 423 first plate, 424 second plate, 425 limiting member, 50 second transparent plate, 60 power supply assembly, 61 box, 62 power supply, 63 controller, 70 frame, 80 light gathering cover.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. Obviously, the implementation embodiment in the description is a part of the present disclosure implementation examples, rather than the implementation of all embodiments, examples. According to the described exemplary embodiment of the present disclosure, all other embodiments obtained by one of ordinary skill in the related art on the premise of no creative work are within the protection scope of the present disclosure.

It should also be understood that the terms used in the specification of the present disclosure are only for the purpose of describing specific embodiments without being intended to limit the present disclosure. As used in the description of the present disclosure and the appended claims, terms of “one”, “one” and “the” in a singular form are intended to include a plural form unless the context clearly indicates otherwise.

It should also be further understood that the term “and/or” used in the description of the present disclosure and the appended claims refers to any combination of one or more of associated listed items and all possible combinations, and includes these combinations.

Referring to FIGS. 1-10, an LED lamp in accordance with an embodiment of the present disclosure includes a heat sink 10, an LED light board 20, a first transparent plate 30 and an adjusting member 40. The heat sink 10 includes a first installation groove 12 arranged on a front surface 11 (i.e. an emitting surface) of the heat sink 10, and the LED light board 20 is fixedly installed in the first installation groove 12, the first transparent plate 30 is arranged in the first installation groove 12 and covers on the LED light board 20, and the first transparent plate 30 is configured to control distributions of light emitted from the LED lamp. The adjustment member 40 is arranged on a side of the first transparent plate 30 near a bottom wall 121 of the first installation groove 12, and the adjusting member 40 is connected to the first transparent plate 30 through a transmission way, and drives the first transparent plate 30 to move along a direction perpendicular to the LED light board 20 to adjust a distance between the first transparent plate 30 and the LED light board 20, so as to further adjust distributions of light emitted from LED light beads. The adjusting member 40 includes a rotating member 41 arranged away from the first transparent plate 30, and a moving member 42 arranged near the first transparent plate 30 and connected to the rotating member 41 through a transmission way. The first transparent plate 30 is connected to the moving member 42 through a transmission way, and the rotating member 41 drives the moving member 42 to move, and then the moving member 42 drives the first transparent plate 30 to move, so as to adjust the distance between the first transparent plate 30 and the LED light board 20.

The rotating member 41 includes a rotation shaft 411 and a gear 412, and the moving member 42 includes a plurality of tooth-holes 421 matched with the gear 42, the rotation shaft 411 rotatably installed on the heat sink 10 and connected to the gear 42 through a transmission way. When the LED lamp is used, the rotation shaft 411 rotates to drive the gear 412 to rotate, and the gear 412 meshes with the tooth-hole 421 of the moving member 42, so that the gear 412 drives the moving member 42 to move. The moving member 42 includes a passageway 422, and the first transparent plate 30 includes a first connecting portion 31 inserted into the passageway 422, and the passageway 422 extends from near a side of the LED light board 20 to near a side of the first transparent plate 30.

The moving member 42 includes a first plate 423 and a second plate 424 perpendicularly connected with the first plate 423, the first plate 423 parallel to the LED light board 20, the second plate 424 perpendicular to the LED light board 20, the plurality of tooth-holes 421 laid flat on the first plate 423, and the passageway 422 arranged on the second plate 424. When adjusting a position of the first transparent plate 30, the rotation shaft 411 drives the gear 412 to rotate, and the gear 412 drives the moving member 42 to move in parallel, that is, both the first plate 423 and the second plate 424 are driven to move along a direction parallel to the LED light board 20. The first connecting portion 31 of the first transparent plate 30 is inserted into the passageway 422 of the second plate 424, so that both the first transparent plate 30 and the first connecting portion 31 will move along a direction perpendicular to the LED light board 20 under a pressure of the passageway 422 of the second plate 424, so as to adjust the distance between the first transparent plate 30 and the LED light board 20. The first plate 423 is limited to the heat sink 10 by a limiting member 425 that can be a limiting block or a screw. If the limiting member 425 is a screw, a certain gap is formed between a nut of the screw and the first plate 423.

The passageway 422 is an inclined long-strip-shaped hole, and an angle is formed between the passageway 422 and a movable direction of the moving member 42. An inclination direction of the passageway 422 is inclined relative to the movable direction of the moving member 42, that is, the passageway 422 gradually approaches the first transparent plate 30 from a side of the second plate 424 towards a middle direction of the second plate 424.

Figure 9:
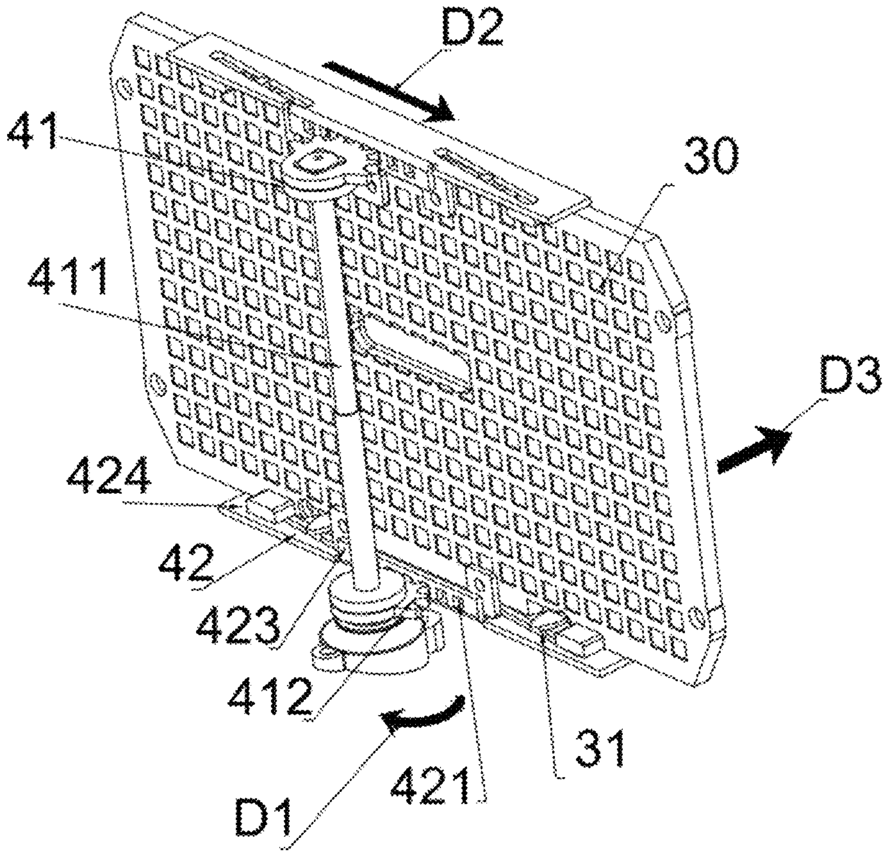
FIG. 9 is a schematic view of a rotational connection between a rotating member and a first transparent plate of the LED lamp of FIG. 1.
Figure 10:
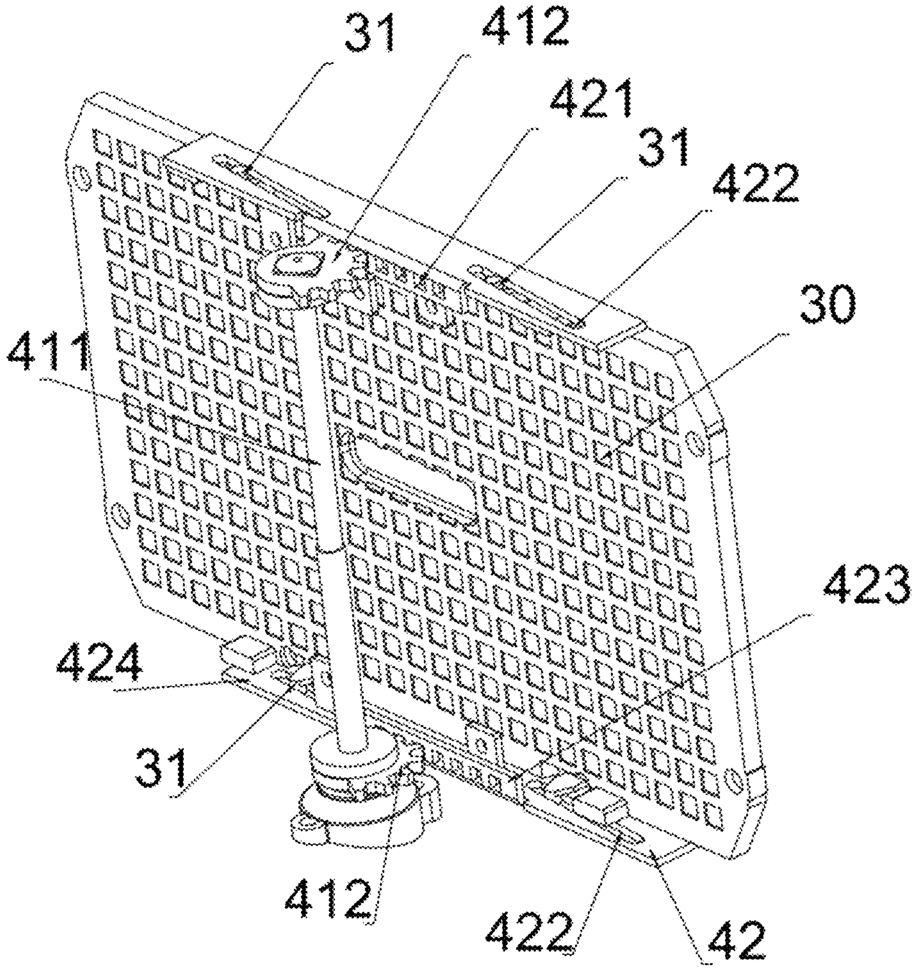
FIG. 10 is similar to FIG. 9, but shown another rotational connection between the rotating member and the first transparent plate of the LED lamp of FIG. 1.

Referring to FIG. 9, the following is a description of a motion process of the LED lamp, a rotation direction of the rotation shaft 411 is taken as a direction D1 shown in FIG. 9, that is, the rotation shaft 411 rotates to the left. When the rotation shaft 411 drives the gear 412 to rotate, the gear 412 drives the moving member 42 to move along a direction D2 shown in FIG. 9 that is parallel to the LED light board 20, that is, the moving member 42 moves to the left. In this way, the passageway 422 also moves along the direction D2, that is, the passageway 422 moves to the left. The passageway 422 is inclined that gradually approaches the first transparent plate 30 from the side of the second plate 424 towards the middle direction of the second plate 424.

It is assumed that an initial position of the first transparent plate 30 is arranged on a side near the LED light board 20, that is, at the initial position, the distance between the first transparent plate 30 and the LED light board 20 is the smallest.

When the moving member 42 and the passageway 422 move horizontally along the direction D2 that is parallel to the LED light board 20, a side wall of the passageway 422 will squeeze the first connecting portion 31 of the first transparent plate 30, causing that the first connecting portion 31 moves along the passageway 422, and the first connecting portion 31 moves along a direction D3 away from the LED light board 20, and then, the first transparent plate 30 moves along the direction D3 perpendicular to the LED light board 20, so that the distance between the first transparent plate 30 and the LED light board 20 can be adjusted. It should be noted that a shape of the passageway 422 can also be curved, as long as the passageway 422 gradually approaches the first transparent plate 30 from the side of the second plate 424 to the middle direction of the second plate 424. Specific shapes of the passageway 422 can be set according to actual requirements.

In an optional embodiment, the first plate 423 is arranged at the middle of the second plate 424, and there are two passageways 422 respectively arranged on both sides of the second plate 424. The two passageways 422 are symmetrically arranged on both sides of the second plate 424. In this way, when the moving member 42 moves, forces applied on both sides of the moving member 42 are uniform, so that it can ensure that the first transparent plate 30 moves smoothly along the direction perpendicular to the LED light board 20, to avoid the first transparent plate 30 from titling during movement of the first transparent plate 30.

A bottom wall 121 of the first installation groove 12 is recessed towards a back surface 15 of the heat sink 10 to form a second installation groove 13, and the heat sink 10 includes a third installation groove 14 arranged an interior of the heat sink 10. The moving member 42 is received in the second installation groove 13, and the rotating member 41 is installed in the third installation groove 14. The rotating member 41 and the moving member 42 are respectively installed in the third installation groove 14 and the second installation groove 13, so that the first transparent plate 30 can be placed as close as possible to the LED light board 20, thereby maximizing an adjustable range of the distance between the first transparent plate 30 and the LED light board 20, and reducing an overall size of the LED lamp. In an embodiment of the present disclosure, the LED lamp includes two moving members 42 and two second installation grooves 13, the two second installation grooves 13 respectively arranged on both sides of the bottom wall 121 of the first installation groove 12. The third installation groove 14 is arranged in a middle of the first installation groove 12, and the third installation groove 14 is perpendicular to the two second installation grooves 13. The rotating member 41 includes two gears 412 respectively installed at two end portions 4111 of the rotation shaft 411, and the two gears 412 matched with corresponding first plates 423 of the two moving members 42. The two moving members 42 are set to drive the first transparent plate 30 to move, which can obtain a better smooth movement performance thereof.

During installing the LED lamp of the present disclosure, the moving member 41 is first installed in the second installation groove 13 and the third installation groove 14, and the rotation shaft 411 and the gear 412 are meshed with each other. And then, the LED light board 20 is installed in the first installation groove 12, the first transparent plate 30 is installed, and the first connecting portion 31 of the first transparent plate 30 is inserted into the passageway 422 of the second plate 424 of the moving member 42, so that the rotating member 41 and the first transparent plate 30 are movably connected with each other. By rotating the rotation shaft 411 of the rotating member 41, the gear 412 is driven to rotate, so that the moving member 42 is driven to move along the direction parallel to the LED light board 20. The first connecting portion 31 of the first transparent plate 30 is squeezed by the passageway 422 of the second plate 424, so that the first transparent plate 30 moves along the direction perpendicular to the LED light board 20, thereby adjusting the distance between the LED light board 20 and the first transparent plate 30, and further adjusting distributions of light emitted from light beads of the LED light board 20.

A rotating portion 413 is connected to the end portion 4111 of the rotation shaft 411, and an inner hexagonal hole 4131 is defined at an end of the rotating portion 413 far from the rotation shaft 411 and exposed out of the heat sink 10. In this way, the rotation shaft 411 can be adjusted to rotate from the outside, a hex wrench is inserted into the inner hexagonal hole 4131 during adjustment, and the rotation shaft 411 rotates to adjust the distance between the first transparent plate 30 and the LED light board 20. The rotating portion 413 includes a shaft sleeve 414 arranged on an outer circumference thereof, the shaft sleeve 414 sleeved around the rotating portion 413 and fixed on the heat sink 10.

It should be noted that in some embodiments of the present disclosure, a knob can also be connected to the bottom of the rotation shaft 411 to drive the rotation shaft 411 to rotate by rotating the knob, thereby adjusting the distance between the first transparent plate 30 and the LED light board 20.

In an embodiment of the present disclosure, the LED lamp further includes a second transparent plate 50 and a box-shaped light gathering cover 80. The second transparent plate 50 is arranged on a side of the first transparent plate 30 far from the LED light board 20, and covering on the first installation groove 12. The first transparent plate 30 is an optical lens plate and the second transparent plate 50 is a flat plate. The second transparent plate 50 is provided to limit a travel of the first transparent plate 30, and at the same time, the second transparent plate 50 can also seal the first installation groove 12, which plays a dustproof and waterproof role thereof. The light gathering cover 80 is arranged on an outer circumference of the second transparent plate 50.

In an embodiment of the present disclosure, the LED lamp is a floodlight, and further includes a power supply assembly 60 installed on the back surface 15 of the heat sink 10, and a frame 70. The power supply assembly 60 includes a box 61, a power supply 62 and a controller 63. Both the power supply 62 and the controller 63 are installed inside the box 61, and the frame 70 is connected to the box 61, which can separate the frame 70 from the inner hexagonal hole 4131 in front and back, so that the inner hexagonal hole 4131 can be easier contacted, to be convenient for users to rotate the rotation shaft 411. Furthermore, heat generated by the power supply 62 is independent from heat generated by the LED light board 20, which is non-affected from each other, to improve service lives of the power supply 62 and the LED light board 20.

The present disclosure provides the advantages as below: the present disclosure can conveniently adjust positions of the first transparent plate 30 (i.e. a lens plate), according to requirements of different usage conditions, to further adjust distribution directions of light emitted from the LED lamp, which can adjust the distribution directions of light emitted from the LED lamp without needing to disassemble the LED lamp, and have a simple and convenient operation thereof.

Although the features and elements of the present disclosure are described as embodiments in particular combinations, each feature or element can be used alone or in other various combinations within the principles of the present disclosure to the full extent indicated by the broad general meaning of the terms in which the appended claims are expressed. Any variation or replacement made by one of ordinary skill in the related art without departing from the spirit of the present disclosure shall fall within the protection scope of the present disclosure.

What is claimed is:

1. An LED lamp comprising:

a heat sink defining a first installation groove arranged on a front surface thereof; a rotating member and a moving member movably connected with the rotating member, both the rotating member and the moving member installed on the heat sink;

an LED light board received in the first installation groove; and a first transparent plate covering on the LED light board and comprising a first connecting portion arranged on a side of the first transparent plate near the moving member to movably connect with the moving member; and wherein the rotating member comprises a rotation shaft and a gear connected to the rotation shaft through a transmission way, and the moving member comprises a plurality of tooth-holes matched with the gear; the first transparent plate is connected to the moving member through a transmission way, and the rotation shaft rotates to drive the gear to rotate, so that both the moving member and the first transparent plate are driven to move; and wherein the moving member comprises a passageway and the first connecting portion is inserted into the passageway; when the moving member moves, both the first connecting portion and the first transparent plate are driven by the moving member to move synchronously.

2. The LED lamp as claimed in claim 1, wherein the moving member comprises a first plate and a second plate perpendicularly connected with the first plate, the first plate parallel to the LED light board, the second plate perpendicular to the LED light board, the plurality of tooth-holes arranged on the first plate, and the passageway arranged on the second plate.

3. The LED lamp as claimed in claim 2, wherein the first plate is arranged at a middle of the second plate, the plurality of tooth-holes laid flat on the first plate; the moving member comprising two passageways respectively arranged on both sides of the second plate.

4. The LED lamp as claimed in claim 3, wherein a bottom wall of the first installation groove is recessed towards a back surface of the heat sink to form a second installation groove for receiving the moving member therein; the heat sink comprising a third installation groove arranged an interior of the heat sink, the rotating member installed in the third installation groove, and all the first installation groove, the second installation groove and the third installation groove are interconnected.

5. The LED lamp as claimed in claim 4, wherein the LED lamp defines two moving members and two second installation grooves, the two second installation grooves respectively arranged on both sides of the bottom wall of the first installation groove; the rotating member comprising two gears respectively installed at two end portions of the rotation shaft, and the two gears matched with the two moving members, respectively.

6. The LED lamp as claimed in claim 5, wherein a rotating portion is connected to the end portion of the rotation shaft, an inner hexagonal hole defined at an end of the rotating portion far from the rotation shaft and exposed out of the heat sink.

7. The LED lamp as claimed in claim 5, wherein the LED lamp further comprises a second transparent plate arranged on a side of the first transparent plate far from the LED light board, and covering on the first installation groove; the first transparent plate is an optical lens plate and the second transparent plate is a flat plate.

8. The LED lamp as claimed in claim 5, wherein the LED lamp is a floodlight, and further comprises a power supply assembly installed on the back surface of the heat sink, and a frame connected to the box or to the heat sink, the power supply assembly comprising a box, an power supply and a controller, and both the power supply and the controller installed inside the box.

9. An LED lamp comprising:

a heat sink defining a first installation groove thereof;

an LED light board received in the first installation groove;

a first transparent plate arranged in the first installation groove and covering on the LED light board;

an adjusting member installed on the heat sink and connected to the first transparent plate through a transmission way; and wherein the adjusting member drives the first transparent plate to move along a direction perpendicular to the LED light board to adjust a distance between the first transparent plate and the LED light board, so as to further adjust distributions of light emitted from the LED light board; and wherein the adjusting member comprises a rotating member arranged away from the first transparent plate, and a moving member arranged near the first transparent plate and connected to the rotating member through a transmission way; the first transparent plate connected to the moving member through a transmission way; the rotating member driving the moving member to move, so as to further drive the first transparent plate to move; and wherein the rotating member comprises a rotation shaft rotatably installed on the heat sink, and a gear connected to the rotation shaft through a transmission way, and the moving member comprises a plurality of tooth-holes matched with the gear; the rotation shaft rotates to drive the gear to rotate, so that the moving member is driven to move.

10. The LED lamp as claimed in claim 9, wherein the moving member further comprises a passageway extending from near a side of a bottom wall of the first installation groove to near a side of the first transparent plate, and the first transparent plate comprises a first connecting portion inserted into the passageway.

11. The LED lamp as claimed in claim 10, wherein the moving member comprises a first plate and a second plate perpendicularly connected with the first plate, the first plate parallel to the LED light board, the second plate perpendicular to the LED light board, the plurality of tooth-holes arranged on the first plate, and the passageway arranged on the second plate.

12. The LED lamp as claimed in claim 10, wherein the passageway is an inclined long-strip-shaped hole, and an angle is formed between the passageway and a movable direction of the moving member; when the passageway moves along a direction parallel to the LED light board, the first connecting portion is compressed to move along a direction perpendicular to the LED light board, so as to adjust the distance between the first transparent plate and the LED light board.

13. The LED lamp as claimed in claim 11, wherein the first plate is arranged at a middle of the second plate, the plurality of tooth-holes laid flat on the first plate; the moving member comprising two passageways respectively arranged on both sides of the second plate.

14. The LED lamp as claimed in claim 13, wherein a bottom wall of the first installation groove is recessed towards a back surface of the heat sink to form a second installation groove for receiving the moving member therein; the heat sink comprising a third installation groove arranged an interior of the heat sink, the rotating member installed in the third installation groove, and all the first installation groove, the second installation groove and the third installation groove are interconnected.

15. The LED lamp as claimed in claim 14, wherein the LED lamp defines two moving members and two second installation grooves, the two second installation grooves respectively arranged on both sides of the bottom wall of the first installation groove; the third installation groove arranged in a middle of the first installation groove, and the third installation groove perpendicular to the two second installation grooves; the rotating member comprising two gears respectively installed at two end portions of the rotation shaft, and the two gears matched with the two moving members, respectively.

16. The LED lamp as claimed in claim 9, wherein a rotating portion is connected to the end portion of the rotation shaft, an inner hexagonal hole defined at an end of the rotating portion far from the rotation shaft and exposed out of the heat sink; the rotating portion comprising a shaft sleeve arranged on an outer circumference thereof, the shaft sleeve sleeved around the rotating portion and fixed on the heat sink.

* * * * *